(12) United States Patent
Zhang et al.

(10) Patent No.: US 7,859,607 B2
(45) Date of Patent: Dec. 28, 2010

(54) APPARATUS AND METHOD FOR ASSEMBLING LIQUID CRYSTAL DISPLAY

(75) Inventors: Hua-Liang Zhang, Chiang Su (CN);
Hung-I Kuo, Hsinchu Hsien (TW);
Rui-Xiang Lai, Chiang Su (CN);
Xiao-Fei Chen, Chiang Su (CN)

(73) Assignee: Au Optronics Corp., Hsinchu (TW)

( * ) Notice: Subject to any disclaimer, the term of this patent is extended or adjusted under 35 U.S.C. 154(b) by 1268 days.

(21) Appl. No.: 11/429,996

(22) Filed: May 9, 2006

(65) Prior Publication Data
US 2006/0256252 A1 Nov. 16, 2006

(30) Foreign Application Priority Data
May 10, 2005 (TW) .................. 94115056 A

(51) Int. Cl.
*G02F 1/1333* (2006.01)
(52) U.S. Cl. ............................. 349/58; 349/187
(58) Field of Classification Search ............... None
See application file for complete search history.

(56) References Cited

U.S. PATENT DOCUMENTS

| 6,853,435 | B2 * | 2/2005 | Tanaka et al. ............... 349/177 |
| 7,252,863 | B2 * | 8/2007 | Ryu et al. ................... 427/598 |
| 7,527,083 | B2 * | 5/2009 | Kobayashi et al. .......... 156/382 |
| 7,701,547 | B2 * | 4/2010 | Motomatsu ................. 349/189 |
| 2003/0049547 | A1 * | 3/2003 | Andrews et al. ............... 430/7 |
| 2003/0151710 | A1 * | 8/2003 | Tanaka et al. ............... 349/123 |
| 2003/0178467 | A1 * | 9/2003 | Lee et al. ...................... 228/42 |
| 2004/0108075 | A1 * | 6/2004 | Choo et al. .................. 156/510 |
| 2004/0135963 | A1 | 7/2004 | Chin et al. |

FOREIGN PATENT DOCUMENTS

| JP | 10-68945 A | 10/1998 |
| JP | 11-295732 A | 10/1999 |
| TW | 594159 B | 6/2004 |
| TW | I232492 | 5/2005 |

* cited by examiner

*Primary Examiner*—David Nelms
*Assistant Examiner*—Thanh-Nhan P Nguyen
(74) *Attorney, Agent, or Firm*—Birch, Stewart, Kolasch & Birch, LLP

(57) ABSTRACT

A method for assembling a liquid crystal display includes steps of disposing a liquid crystal panel and a backlight module and blowing an ionic flow into the space between the liquid crystal panel and the backlight module to clean the surfaces of them. In addition, the method can be proceeded by an apparatus for assembling the liquid crystal display. The apparatus comprises a fastening device, a hoist platform, and an ionic particle-removal device. The fastening device has several vacuum suckers used to attach the surface of a liquid crystal panel and the panel is held and fixed. The hoist platform is disposed vertically under the fastening device to carry a backlight module and thus to adjust the distance between the liquid crystal panel and the backlight module. The ionic particle-removal device, which is disposed at a lateral part of the hoist platform and the fastening device, is capable of blowing an ionic flow to remove the particles and electrostatic charges attached on the surface of the liquid crystal panel and the backlight module simultaneously during assembly.

8 Claims, 3 Drawing Sheets

APPARATUS AND METHOD FOR ASSEMBLING LIQUID CRYSTAL DISPLAY

BACKGROUND OF THE INVENTION

1. Field of the Invention

The invention relates to an apparatus and a method for assembling liquid crystal displays, specifically to such an apparatus and a method which proceed assembling along with cleaning.

2. Description of the Prior Art

At present, the primary manufacturing process of thin film transistor liquid crystal displays (TFT-LCD) is divided into three stages, comprising:

(a) first, manufacturing thin film transistors on a glass substrate, thereby yielding an array substrate on which many thin film transistors are fabricated and arranged in array pattern. This is called, in general, an array manufacturing process.

(b) second, fitting the array substrate heretofore with a filter, then injecting liquid crystal in between, thereby generating a liquid crystal panel. This is called a manufacturing process of liquid crystal panel.

(c) finally, fitting the liquid crystal panel, a backlight module, driver ICs, and other corresponding components together. This is called module assemblage.

Originally during the assembly fitting the liquid crystal panel and the backlight module together is by stacking the liquid crystal panel at the exact position upon the backlight module and then fastening them. If particles attached on the respective surface of the backlight module or the liquid crystal panel were not removed during the assemblage, thereafter they would deteriorate optical properties of the liquid crystal display.

Thus a protective film is pasted on respective the surface of the backlight module or the liquid crystal panel in the present assemblage and it is peeled when assemblage starts. In addition, a particle-removing step is incorporated during the assemblage process such that the assemblage process includes the following steps:

(a) Disposing the backlight module on a platform, peeling the protective film from the backlight module, lighting up the backlight module to providing the light for humans to examine whether particles attach on the module. If attached particles are found, a sticky bar is used to take away the particles.

(b) Peeling the protective film from the surface of liquid crystal panel and take it to the front of an ionic fan so that the attached particles can be blown away; thereafter stacking the liquid crystal panel on the backlight module.

Nevertheless, the assemble method heretofore known suffers a number of disadvantages:

1. It costs a number of human resource employing human naked eyes to examine whether particles attach on the surface of the backlight module. This process is liable to loss of detection and further increases yielding cost and reduces yielding efficiency.

2. When finding particles, workers use a sticky bar to remove them. It is likely to cause scratches on the optical thin film on the surface of the backlight module during the cleaning process because of worker's negligence (for example, by improper force or moving in a wrong direction), thereby deteriorating optical quality. In addition, the stick bar is not replaced just after it stuck particles, rather it is replaced after particles has accumulated up to some extent on the bar. Hence, the repeated use of stick bar can not guarantee the quality of clean of products.

3. After the protective film was peeled from the liquid crystal panel, an ionic fan is used to clean the surface of the liquid crystal panel. It is likely to keep residual particles on the panel after cleaning using the ionic fan because of the angle of cleaning flow, the time, and the ionic fan itself that can be a source making the undesirable particles.

4. During peeling the protective films from the respective surface of the liquid crystal panel or the backlight module, a number of static charges accumulate on the surface because of not being removed properly, and then the optical thin film on the backlight module distorts because it is attracted by the static charges from the panel.

Therefore, how to get rid of the disadvantages heretofore and how to improve the efficiency of the assemblage of fitting the liquid crystal panel and the backlight module together are objects for people familiar with this art to dedicate.

SUMMARY OF THE INVENTION

In accordance with the present invention a method of assemblage is disclosed that particles attaching and electrostatic charges accumulating on the surface of the liquid crystal panel and that of the backlight module will be removed while fitting the panel and the module together. The steps of the assembly method are:

(a) to fasten respectively the liquid crystal panel and the backlight module and to dispose them vertically align by a span.

(b) to inject an ionic flow in between the liquid crystal panel and the backlight module so that the particles in between the surfaces can be removed and electrostatic charges can be neutralized.

(c) to stack the liquid crystal panel on the backlight module and then fit them together.

The present invention heretofore also discloses an apparatus for assembling the liquid crystal display. Use both the apparatus and the method heretofore to fit the liquid crystal panel and the backlight module together.

The apparatus comprises a fastening device, a hoist platform, and an ionic particle-removal device.

The fastening device, using plural vacuum suckers to attach the liquid crystal panel.

The hoist platform, disposed vertically under the fastening device and carrying a backlight module so that the gap between the liquid crystal panel and the backlight module can be adjusted.

The ionic particle-removal device, disposed at the lateral of the hoist platform and the fastening device and blowing an ionic flow to remove the particles and electrostatic charges from the surfaces of the liquid crystal panel and the backlight module.

BRIEF DESCRIPTION OF THE DRAWINGS

Other features and advantages of this invention will become more apparent in the following detailed description of the preferred embodiments of this invention, with reference to the accompanying drawings, in which.

DESCRIPTION OF THE PREFERRED EMBODIMENTS

Figure 1:
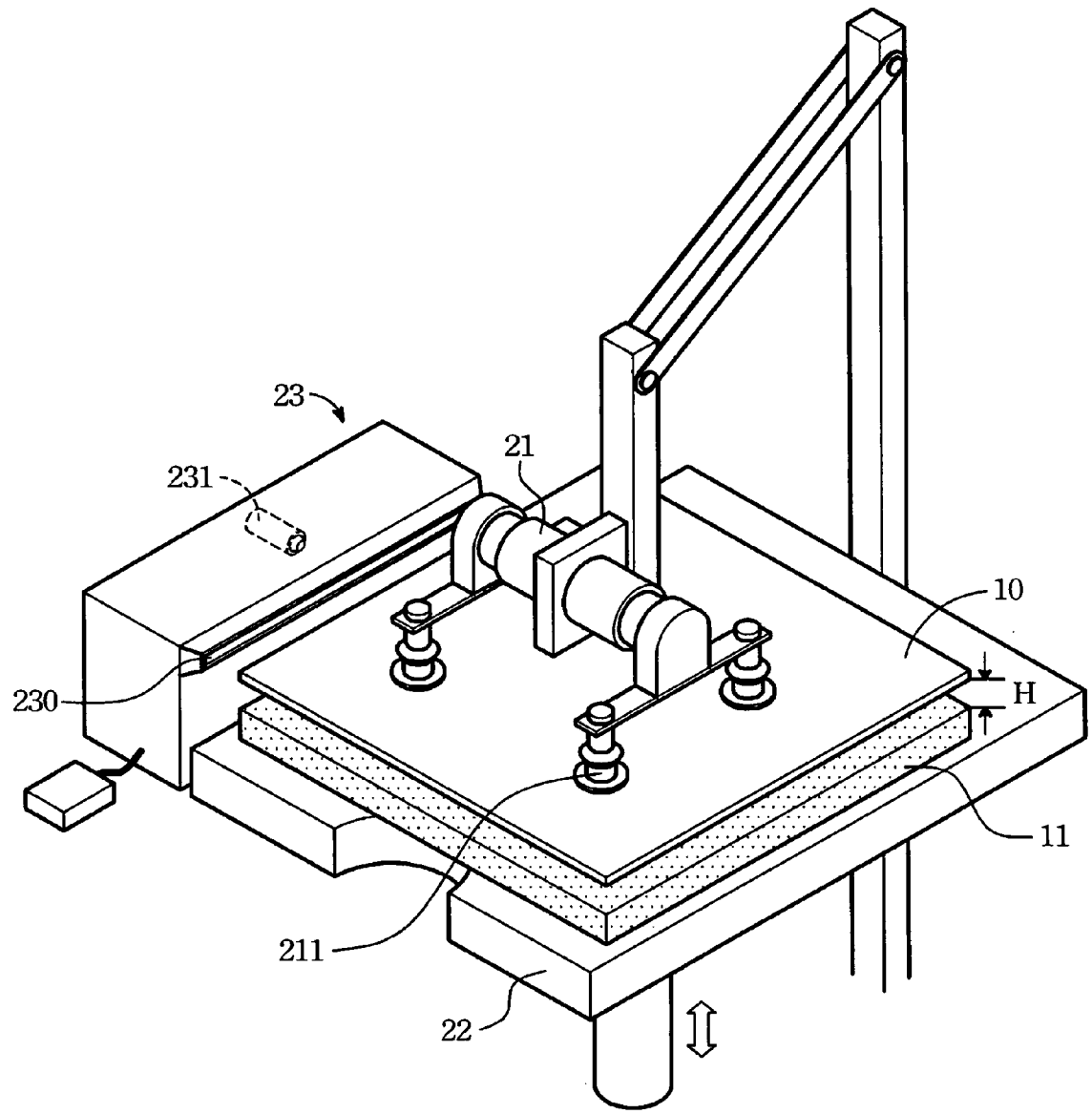
FIG. 1 shows a three-dimension view schematic of an embodiment of the present invention.

An embodiment of the assembling apparatus of the present invention is illustrated in FIG. 1. The apparatus of the embodiment can fit a liquid crystal panel 10 and a backlight module 11 together.

The assembling apparatus 2 comprises a fastening device 21, a hoist platform 22, and an ionic particle-removal device 23.

Fastening device 21 is used to carry liquid crystal panel 10 during assemblage. In the present embodiment a robotic arm is used and its one end moves up and down to change its position. There are plural vacuum suckers 211 providing a proper attracting force at the end of the arm. Certainly, there are various possibilities by using similar fastening devices providing attracting or carrying force for fastening the panel.

Hoist platform 22, which is vertically disposed just below fastening device 21, is used to carry backlight module 11 during assemblage. It can move up and down for adjusting a gap between liquid crystal panel 10 and backlight module 11.

Ionic particle-removal device 23, which is disposed at the sides of both hoisting platform 22 and fastening device 21, comprises a flow guiding mask 230 and a first-ionic air gun 231. An ionic flow is generated by first-ionic air gun 231 and flows through the mask. Certainly, the shape of flow guiding mask 230 can be of various designs in accordance with different requirements. For example, the opening of flow guiding mask 230 may shrink gradually so that the ionic flow is forced to flow more concentratedly.

In addition, first-ionic air gun 231 can be connected to an air flow storage (not shown in Fig.) and the air flow is ionized while traversing through gun 231 and then flows out. Practically, a switch can be used to operate ionic particle-removal device 23.

The assemblage of fitting liquid crystal panel 10 and backlight module 11 using assembly device 2 in the present embodiment can proceed by the following steps:

a. Disposing backlight module 11 on hoist platform 22 and then peeling the protective film from the surface of module 11.
b. Stacking liquid crystal panel 10 above the proper position of backlight module 11 after the protective film on the surface of panel 10 was peeled.
c. Disposing fastening device 21 (e.g., a robotic arm) to enable vacuum suckers 211 at one end of fastening device 21 to attach liquid crystal panel 10 in still.
d. Lowering hoist platform 22 so that panel 10 and module 11 are separated by a span.
e. Turning on the switch to start ionic particle-removal device 23 where the ionic flow from first-ionic air gun 231 traverses through mask 230 into the space in between panel 10 and module 11.
f. Lifting hoist platform 22 after particles have been removed so that backlight module 11 can return to its original position, where liquid crystal panel 10 is stacked on backlight module 11, for ensuing assemblage.

Blowing the ionic flow heretofore towards the space in between liquid crystal panel 10 and backlight module 11 can respectively remove the particles and neutralize the electrostatic charges on surfaces of both panel 10 and module 11 at the same time. In addition, steps of fitting and cleaning process can be integrated because cleaning process proceeds while assemblage is performing, which makes not only sparing the time, but consuming less human power during cleaning process. Moreover, fitting backlight module 11 and liquid crystal panel 10 together right after cleaning process assures that both of them will not be polluted again with particles after cleaning.

In the present embodiment the ionic flow is kept flowing into the space in between liquid crystal panel 10 and backlight module 11 before both of them are stacked together to assure the quality of cleaning during assembling process. In a preferred embodiment the process to obtain a better quality of cleaning is by injecting the ionic flow for a moment (e.g. several seconds) after hoist platform 22 is lowered. Then lifting up platform 22 such that panel 10 can stack on module 11

In addition, to achieve a better effectiveness for neutralizing the electrostatic charges is by separating liquid crystal panel 10 and backlight module 11 by gap H of 10 mm and then injecting the ionic flow in between.

Please refer to the following table as shown. This is a table of records of times measured at three distinct points, point 1, 2, and 3 located between liquid crystal panel 10 and backlight module 11 which are separated by different spans while the ionic flow is flowing through in between and the voltage drops from 1000V to 0V.

| Position | 5 mm | 10 mm | 15 mm | 20 mm | 25 mm |
| --- | --- | --- | --- | --- | --- |
| 1 | 2.1 | 1.4 | 1.6 | 1.7 | 2.5 |
| 2 | 1.6 | 1.1 | 1.4 | 1.7 | 2.1 |
| 3 | 2.1 | 1.3 | 1.5 | 2.0 | 2.2 |
| Avg(s) | 1.93 | 1.27 | 1.50 | 1.80 | 2.27 |

In accordance with the table static charges can be cancelled fast when the gap is ranged from 5 mm to 25 mm; moreover, they can be eliminated in a shorter time when the gap is by 10 mm.

Figure 2:
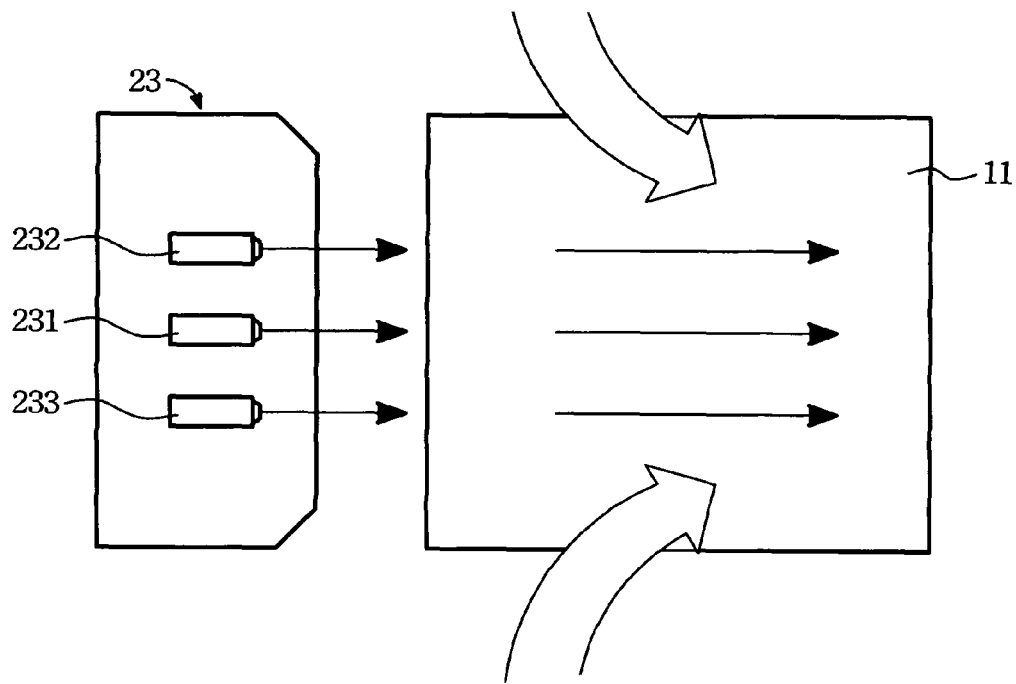
FIG. 2 shows a top view schematic of an embodiment of the present invention where three air guns are disposed in parallel.

In addition, there are various possibilities with regard to different spans dependent on the corresponding dimensions of liquid crystal displays. Please refer to FIG. 2, a top view schematic of an embodiment of the assembling device in the present invention. Only is backlight module 11 shown here and liquid crystal panel 10 is not shown so that it is easier to present the flowing direction of the air flow.

In this embodiment, to enable the ionic flow to flow over a larger area evenly, ionic particle-removal device 23 includes not merely a first ion air gun 231; it adds a second ion air gun 232 and a third ion air gun 231.

The three ion air guns on ionic particle-removal device 23 are disposed in parallel and the ionic flow flows also in parallel through mask 230. Because the pressure of flowing ionic air is lower than that of the air surrounding it, this makes a difference in pressure along two sides of backlight module 11. Therefore, the air surrounding two sides of backlight module 11 is liable to flowing into the space along the sides of module 11 as well as carries particles. Consequently, the particles are likely to occur along the sides of module 11.

Figure 3:
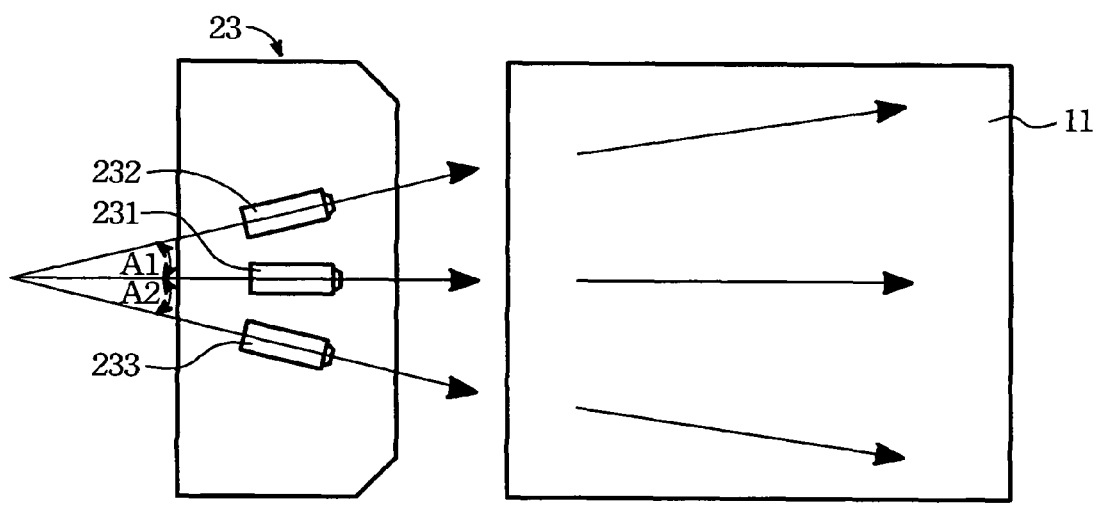
FIG. 3 shows a top view schematic of a preferred embodiment of the present invention where the directions of air flows from the three air guns are arranged by angles.

Accordingly, dispose the nozzles of the three ion air guns in different directions. Please refer to FIG. 3, a top view schematic of the three ion air guns located on ionic particle-removal device 23. As shown in FIG. 3, second ion air gun 232 is located at one side of first ion air gun 231 by a first angle, A1, while third ion air gun 233 located at another side of first ion air gun 231 by a second angle, A2.

The air flow flows in a fan shape through guiding mask 230 by arranging these three ion air guns in a fan-like form. This prevents the air from injecting into the space along both sides of backlight module 11 while the ionic flow is flowing into the area of module 11. Though the first angle A1 and the second angel A2 ranged from 2.0 to 15 degree can effectively prevent the air from injecting along both sides of module 11, a better cleaning quality can be achieved when the first angle A1 and the second angle A2 are both by 2.5 degree. Failure yield rate of containing particles on panel 10 or module 11 is reduced from 2.69 percent (when three ion air guns are positioned in parallel) to 1.91 percent (when the first angle A1 and the second angle A2 are both by 2.5 degree).

Figure 4:
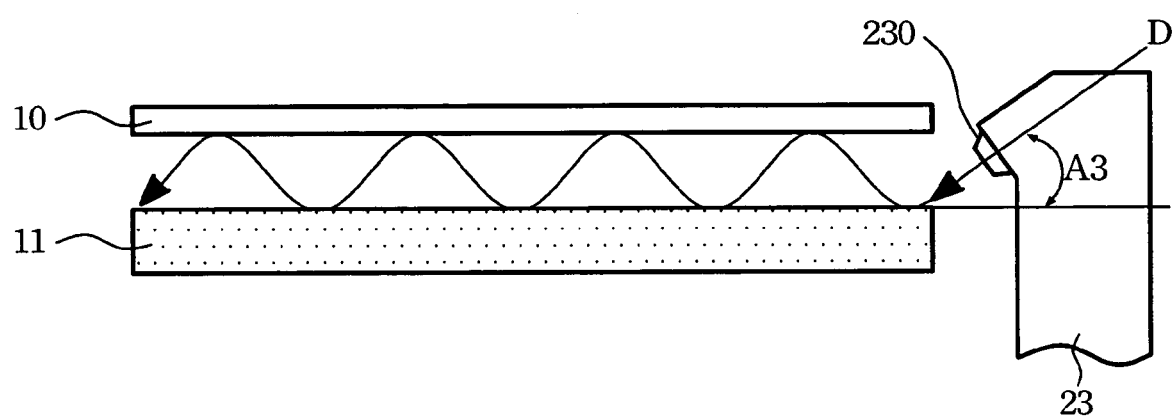
FIG. 4 shows a side view schematic of an embodiment of the present invention.

Please further refer to FIG. 4, a side view schematic for the embodiment of the assembling apparatus of the present invention. A better quality of cleaning is achieved by conducting the flowing direction of the ionic flow by a slanting angle to that of the surface of the liquid crystal panel or the backlight module.

That is, the flow outlet of guiding mask 230 of ionic particle-removal device 23 directs to backlight module 11 or liquid crystal panel so that direction D in which the air flows from guiding mask 230 to that of the surface of backlight module 11 or liquid crystal panel 10 is by a slanting angle A3. Consequently, the ionic flow traverses through the space between backlight module 11 and liquid crystal panel 10 not in parallel with a crooked path to increase the opportunities for the ionic flow contacts with backlight module 11 and liquid crystal panel 10. It is better for slanting angle A3 heretofore by 10 degree.

In accordance with the embodiments heretofore of the present invention a method can simultaneously not only remove the particles effectively but neutralize the electrostatic charges on surfaces of liquid crystal panel 10 and backlight module 11, respectively. In addition, the steps of assembling and cleaning are integrated so that a time and human resources are spared to assure the quality of cleaning during the assemblage. Compared with the well-known assembly devices, the invention achieves a great improvement. After the readers familiar with the art have read the manual and the above embodiments, they will further realize the objects and advantages of the invention or alternative functions for applications.

The embodiment above is to illustrate the invention in detail but not to give a specific embodiment. Any modification that doesn't exceed the essence of the invention should belong to this invention. Thus the invention should be safeguarded according to the claims as follows.

We claim:

1. An apparatus for assembling a liquid crystal display to fit a liquid crystal panel and a backlight module together, comprising:
   a fastening device having several suckers, thereby attaching the liquid crystal panel;
   a hoist platform disposed vertically below the fastening device, thereby carrying the backlight module and adjusting the gap between the liquid crystal panel and the backlight module; and
   an ionic particle-removal device disposed by sides of the hoist platform and the fastening device, the ionic particle-removal device having a flow guiding mask and a first ion air gun generating an ionic flow traversing through the flow guiding mask, thereby removing particles and electrostatic charges on the surfaces in between the liquid crystal panel and the backlight module.

2. The apparatus of claim 1 wherein the direction of the ionic flow through the flow guiding mask to the surface of the backlight module is by a slanting angle.

3. The apparatus of claim 1 wherein the ionic particle-removal device comprises a second ion air gun and a third ion air gun, the second ion air gun is disposed by the left of the first ion air gun and the direction of its nozzle to that of the first ion air gun is by a first angle, the third ion air gun is disposed by the right of the first ion air gun and the direction of its nozzle to that of the first ion air gun is by a second angle.

4. The apparatus of claim 3 wherein the first angle is ranged from about 2 degree to 15 degrees and the second angle is ranged from about 2 degree to 15 degrees.

5. The apparatus of claim 3 wherein the first angle is about 2.5 degree and the second angle is about 2.5 degree.

6. The apparatus of claim 1, wherein the air flows from the guiding mask to a surface of the backlight module, or the liquid crystal panel is by a third angle and the third angle is better by about 10 degree.

7. The apparatus of claim 1, wherein a table static charge can be cancelled fast when a gap of the liquid crystal panel and the backlight module is ranged from 5 mm to 25 mm.

8. The apparatus of claim 1, wherein an opening of the flow guiding mask shrinks gradually so that the ionic flow is forced to flow more concentrative.

\* \* \* \* \*